March 31, 1970  TAKASKI SUZUKI  3,504,104

SELF-BONDING, SURFACE-INSULATED FOIL CONDUCTORS

Filed Dec. 13, 1968

INVENTOR
TAKASHI SUZUKI

BY *Stevens, Davis, Miller & Mosher*

ATTORNEYS

United States Patent Office 3,504,104
Patented Mar. 31, 1970

3,504,104
SELF-BONDING, SURFACE-INSULATED FOIL CONDUCTORS
Takashi Suzuki, Toyonaka-shi, Japan, assignor to Matsushita Electric Industrial Co., Ltd., Osaka, Japan, a corporation of Japan
Filed Dec. 13, 1968, Ser. No. 783,588
Int. Cl. H01b 7/08; H01f 27/30
U.S. Cl. 174—120                    2 Claims

ABSTRACT OF THE DISCLOSURE

A surface-insulated flat foil conductor has placed on one surface a resin and on the other surface a hardener for the resin. After the foil is wound into a coil form, the coil is heated to cause the hardener and resin to react to bond adjacent turns of the coil.

---

The present invention relates to a self-bonding, surface-insulated foil conductor and more particularly to a self-bonding, surface-insulated foil conductor having such a property that when it is formed into a coil and the coil is heated, adjacent turns of said coil are bonded with each other. The term "foil conductor" as used herein refers to an electric conductor consisting of an elongate foil or strip.

It has heretofore been known that use of a foil conductor consisting of a metal, such as aluminum or copper, and having a layer of electric insulator, consisting of a synthetic resin or a metal oxide, formed on the surface thereof, that is, a surface-insulated foil conductor, in the formation of a coil unit, such as a transformer, is advantageous over the use of a wire conductor in improving the volumetric percentage of the conductor in the coil, in reducing the size of the coil, in improving the heat radiation of the coil and in simplifying the coiling operation.

One of the problems encountered in the use of the coil of foil conductor having such advantages as mentioned above, is the relative displacement of the coil turns. Namely, when a coil formed of the surface-insulated foil conductor is used without subjecting it to any treatment, a relative displacement occurs between adjacent turns of the coil because of heat generated in the conductor, current passing through the conductor and/or force imparting to the coil and consequently the coil is deformed. As one of the methods of preventing such displacement of coil turns, it has been proposed to treat the coil with a varnish. However, this method is quite complicated because it involves a series of operations, such as preliminary drying, impregnation, drying and curing. According to another method which has been employed in the formation of a coil of wire conductor, a self-bonding resin coating consisting of a semi-cured resin is previously formed on the surface of an insulated conductor and after forming a coil of the conductor, the coil is heated, whereby the semi-cured resin is fully cured and simultaneously the turns of the coil are bonded with each other. While this method can be applied to foil conductors, it is not practically employed because of the disadvantage that the effective period of the semi-cured resin is short.

The present invention has for its object the provision of a foil conductor which when formed into a coil, enables the coil to be fixed by the latter method described above, namely by self-bonding of the turns of the coil, and which is characterized by its long storage life.

Figure 1:
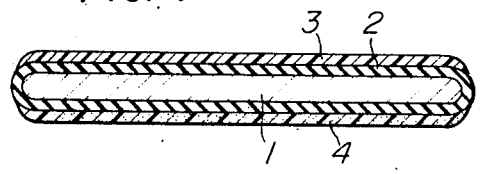
Figure 2:
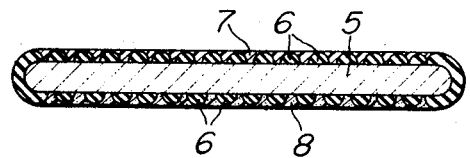

The present invention will be more fully understood from the following detailed description taken in conjunction with the accompanying drawings in which:

FIGS. 1 and 2 are sectional views of different forms of the self-bonding, surface-insulated foil conductor according to the present invention.

Referring to FIG. 1, reference numeral 1 designates a foil conductor, 2 an electric insulator layer formed on the surface of said foil conductor, 3 a heat-melting resin coating formed on one side of the insulator layer 2 and 4 a coating formed on the other side of said insulator layer 2, and containing a hardener which reacts with said resin coating 3 when the latter is molten and thereby cures the molten resin coating. The resin coating 3 and the hardener-containing coating 4 are solid and do not react with each other at normal temperature. However, they are heated to a temperature higher than the melting point of the resin coating 3 and brought into contact with each other, a reaction takes place therebetween and thereby the resin is cured due to polymerization and cross-linking.

It will be understood, therefore, that when the conductor of the structure shown in the drawings is coiled at room temperature and the resultant coil is heated to a prescribed temperature, the turns of the coil can be bonded with each other.

As materials for the heat-melting resin coating, non-cross-linked, solid, thermosetting resins, such as epoxy resins and phenolic resins, are preferably used and if necessary a flexibilizer and a filler are added to said resins. These resins are applied on one side surface of the surface-insulated conductor after dissolving them in a solvent or melting them or dispersing them in a binder in a powdery form.

The hardener-containing coating on the other side surface of the conductor can be formed by applying a hardener, reactable with the aforesaid resin coating, either as such or in mixture with a binder when it is solid in state, or by applying the hardener contained in fine capsules of solid binder when it is liquid in state. Incidentally, the insulator layer 2 is required to be formed only on one side surface of the foil conductor but the melting point thereof must be substantially higher than that of the resin coating 3.

In the embodiment shown in FIG. 1, the self-bonding coating according to the present invention is formed on top of the electric insulator layer which has previously been formed on the surface of a foil conductor. Alternatively, the self-bonding material itself may be used as a part of the surface insulating coating of the foil conductor and an example thereof is shown in FIG. 2.

Namely, in FIG. 2, reference numeral 5 designates a foil conductor, 6 particles of an electric insulating material non-continuously provided on the surface of the foil conductor, 7 a heat-melting resin material provided in the interspace between said particles 6 of electric insulating material on one side surface of the foil conductor and 8 a material applied on the other side surface of the foil conductor and containing a hardener adapted to react with and thereby cure the resin material 7 when the latter is molten.

When a coil formed of the foil conductor having the structure described above is heated to a temperature higher than the melting point of the resin material 7, the resin material 7 is polymerized and cured upon reacting with the hardener contained in the material 8, whereby the turns of the coil are securely bonded with each other. For the electrically insulating particles 6, any material may be used which is substantially higher in melting temperature than the resin material 7 and capable of spacing adjacent turns of the coil from each other. It is only required to provide these particles over the entire surface of at least one side of the foil conductor non-continuously with suitable space between adjacent particles. It is, however, safe to provide the particles at the edge portions of the foil conductor at a higher density than in the other areas.

When a coil is formed using the present foil conductor, the resin material is exposed on the outer peripheral surface of the coil and the hardener-containing material on the inner peripheral surface of the coil. If the exposure of such raw materials on the surface of the coil is undesirable, a layer of the same resin material and a layer of the same hardener-containing material are previously formed on that surface of a bobbin which is contacted by the foil conductor and on that surface of a conductor which is contacted by the insulator coating on the outer peripheral surface of the coil respectively.

The present invention will be further illustrated hereunder by way of example.

EXAMPLE 1

30% solution of an epoxy resin, "Epikote 1007," in oxytol acetate was applied on one side surface of a 100μ thick aluminum foil having an 8μ thick anodic coating previously formed on the surface thereof, and dried to form a resin coating having a thickness of about 3μ. Thereafter, 15% solution of a butylated phenolic resin was applied on the other side surface of the aluminum foil, and dried to form a hardener-containing coating having a thickness of about 1.5μ.

The aluminum foil thus treated was wound around a phenolic resin-made bobbin having a diameter of 50 mm. to obtain a coil of said aluminum foil. Then, the coil was heated at 150° C. for 1 hour and thereby the turns of the coil were completely bonded with each other. On the other hand, the foil conductor wound on the bobbin was left to stand in a room at normal temperature for 150 days and it was found that the self-bonding property of the conductor had been subjected to no substantial change.

EXAMPLE 2

A highly thixotropic epoxy resin was provided non-continuously on the entire surface of an aluminum foil conductor of 50μ in thickness and 100 mm. in width by the intaglio process. The resin was present on the surface of the foil conductor in the form of a particle of about 40μ in diameter and the ratio of the total area of the resin particles to the entire surface of the foil conductor was about 50%. The depths of the intaglio printing boards were so selected that the height of the resin particles on one side surface (surface A) becomes about 40μ and the height of the resin particles on the other side surface (surface B) becomes 10μ. Thereafter, 30% solution of Epikote 1007 in oxytol acetate was applied on the surface A by the roller coating process and dried. Similarly, 10% solution of 4,4'-diamino-diphenylmethane (DDM) in ethanol was applied on the surface B by the roller coating process and dried.

The foil conductor thus treated was wound to form a coil in the same manner as in Example 1 and the resultant coil was heated at 100° C. for 1 hour and then at 200° C. for 2 hours for curing, whereupon the turns of the coil were completely bonded with each other. The result of the induced insulation test conducted on the coil revealed that the dielectric strength between adjacent turns of the coil was 30 v. or higher.

As will be understood from the foregoing description, adjacent turns of a coil formed of the foil conductor according to the present invention can be melt-bonded with each other by heating the coil and therefore relative displacement of the coil turns can be prevented. In addition, since the resin and the hardener are completely isolated from each other, the foil conductor of the invention can be stored over an extended period. It is, therefore, believed that the present invention is of great industrial advantage.

What is claimed is:

1. A self-bonding, surface-insulated foil conductor comprising a substrate foil conductor having the surface thereof insulated, a heat-melting resin coating formed on one side surface of said substrate foil conductor, and a coating formed on the other side surface of said substrate foil conductor and containing a hardener which is capable of curing said resin coating by reacting therewith when the latter is molten.

2. A self-bonding, surface-insulated foil conductor comprising a substrate foil conductor, a heat-melting resin material applied on one side surface of said substrate foil conductor, and a material applied on the other side surface of said substrate foil conductor and containing a hardener which is capable of curing said resin material by reacting therewith when the latter is molten, said foil conductor further comprising an electrically insulating material provided non-continuously on at least one side surface thereof, which insulating material is hard to melt when said resin material is molten.

References Cited

UNITED STATES PATENTS 3,412,354  11/1968  Sattler _____ 174—120 X

E. A. GOLDBERG, Primary Examiner

U.S. Cl. X.R.

117—62.2, 68, 218; 336—205